United States Patent [19]
Shiao

[11] Patent Number: 5,873,648
[45] Date of Patent: Feb. 23, 1999

[54] MULTIPURPOSE TOOL

[76] Inventor: Hsuan Sen Shiao, 6F-6, 186, Section 1, Wen Hsin Rd., Taichung, Taiwan

[21] Appl. No.: 30,516

[22] Filed: Feb. 23, 1998

[51] Int. Cl.$^6$ ..................................................... B25B 23/18
[52] U.S. Cl. ......................... 362/119; 362/120; 362/253
[58] Field of Search .................................. 362/109, 119, 362/120, 234, 253

[56] References Cited

U.S. PATENT DOCUMENTS

| | | | |
|---|---|---|---|
| 5,653,525 | 8/1997 | Park | 362/119 |
| 5,713,656 | 2/1998 | Lin | 362/120 |
| 5,733,034 | 3/1998 | Jan | 362/119 |

*Primary Examiner*—Stephen Husar

[57] ABSTRACT

A multi-purpose tool includes a sleeve having a first end with at least two grooves defined longitudinally in an inner periphery thereof so as to receive a base member therein, and a second end to which a cap is mounted. The base member has a transparent end member formed to one of two ends of the base member and having a hole defined therethrough. A flashlight is received in the sleeve and has a bulb disposed thereto so as to emits light via the transparent end member of the base member. The flashlight has a switch which is accessed via an aperture is defined through a periphery of the sleeve. A knife assembly received in the sleeve and receive the flashlight therein and a receiving member is received in the cap and has a plurality of tips removably disposed thereto.

6 Claims, 8 Drawing Sheets

MULTIPURPOSE TOOL

BACKGROUND OF THE INVENTION

1. Field of the Invention

The present invention relates to a tool and, more particularly, to a multi-purpose tool having a flashlight, a knife assembly and a driver means received therein.

2. Brief Description of the Prior Art

FIG. 1 shows a conventional screw driver which includes a handle 70 and a shank 71 extending longitudinally from one of two ends of the handle 70. The shank 71 has a tip portion 72 having a specific configuration so as to drive a screw. The conventional screw driver has only one function so that a user has to carry many types of screw drivers with him/her to complete his/her work. However, it is heavy to carry many screw drivers and the screw drivers could drop or lost.

The present invention intends to provide an improved multi-purpose tool which includes a flashlight, a knife assembly and a driver means to mitigate and/or obviate the above-mentioned problems.

SUMMARY OF THE INVENTION

In one aspect of the present invention, there is provided a multi-purpose tool comprising a sleeve having a first end with at least two grooves defined longitudinally in an inner periphery thereof, and a second end with a cap mounted thereto. An aperture is defined through a periphery of the sleeve.

A base member has at least two ridges extending longitudinally from a periphery thereof so as to be received in the grooves, a transparent end member formed to one of two ends of the base member and having a hole defined therethrough.

A flashlight has two parts pivotally connected to each other so as to receive at least one battery between the two parts. A bulb is disposed to one of two ends of a combination of the two parts.

A knife assembly is received in the sleeve and has a blade retractably disposed to a first side thereof and a receiving area is defined between the first side and a second side of the knife assembly so as to receive the flashlight therein.

A receiving member is received in the sleeve and has a plurality of tips removably disposed thereto.

It is an object of the present invention to provide a multi-purpose tool having a flashlight and a knife assembly therein.

It is another object of the present invention to provide a multi-purpose tool which is able to be cooperated with a shank so as to be used as a screw driver.

It is a further object of the present invention to provide a multi-purpose tool which provides light when used as a screw driver.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
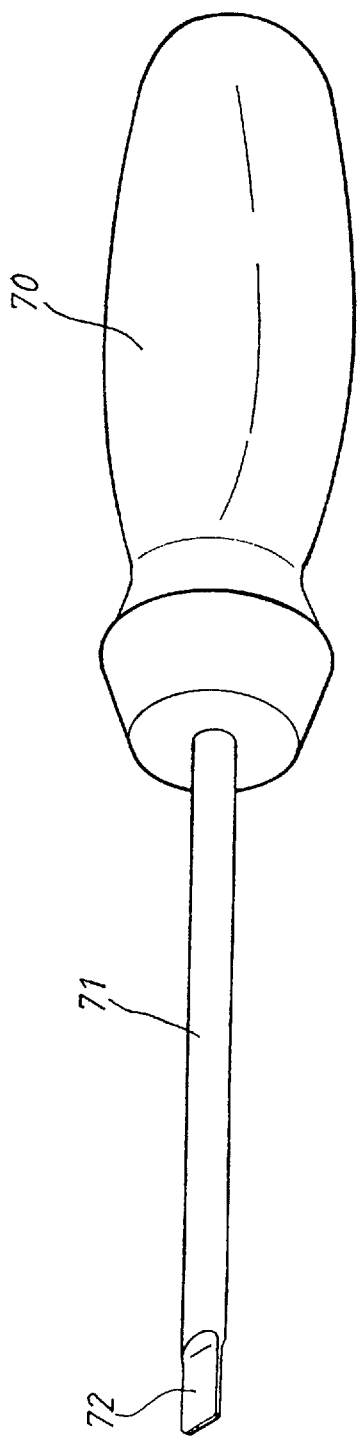
FIG. 1 is a perspective view of a conventional screw driver.
Figure 2:
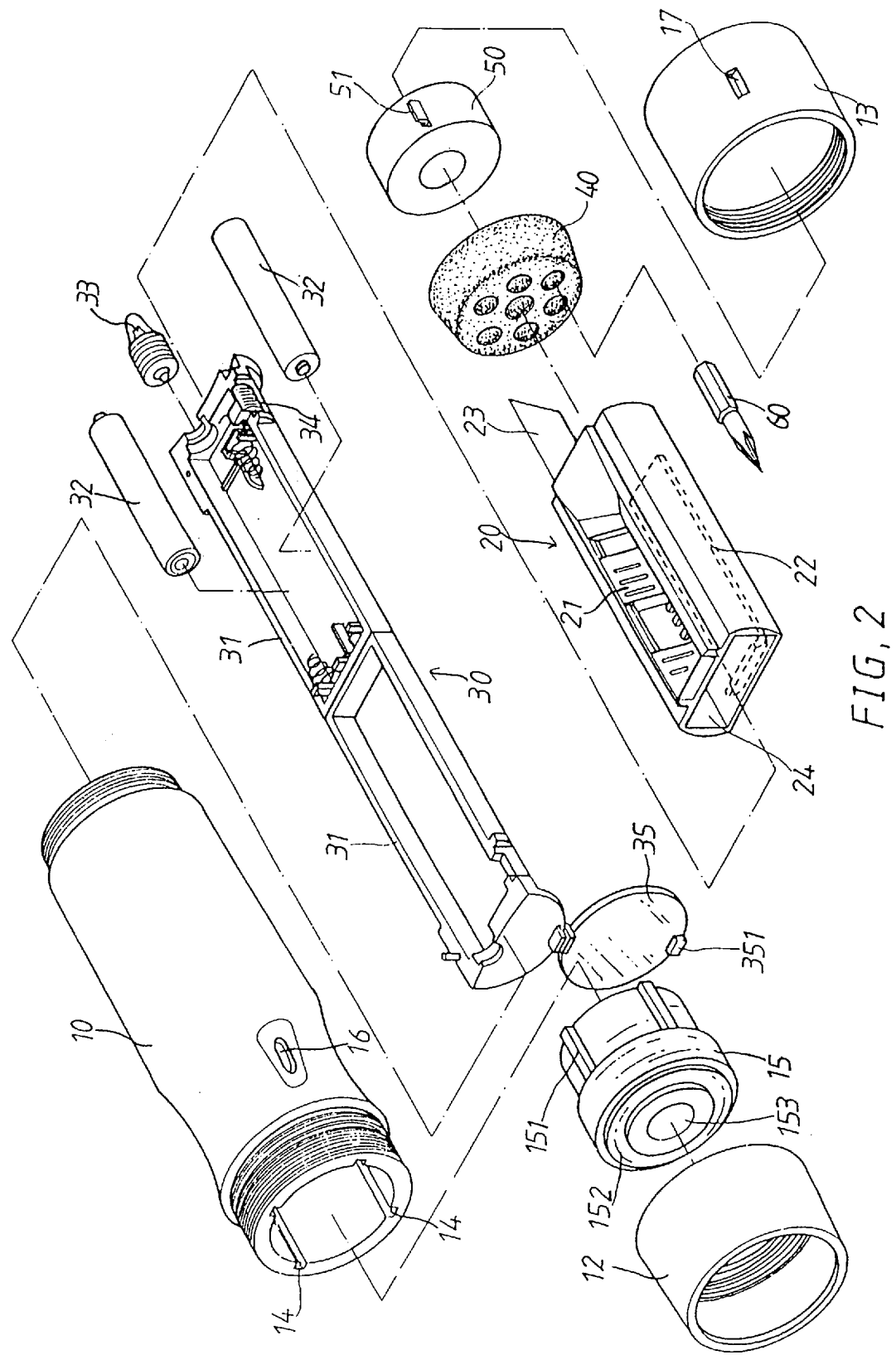
FIG. 2 is an exploded view of a multi-purpose tool in accordance with the present invention.

Referring to the drawings and initially to FIGS. 1 and 2, a multi-purpose in accordance with the present invention generally includes a sleeve 10 having a first end with four grooves 14 defined longitudinally in an inner periphery thereof, and a second end to which a cap 13 is threadedly mounted which has a slot 17 defined in a periphery thereof. A collar member 12 is threadedly mounted to the first end of the sleeve 10 and an aperture 16 is defined through a periphery of the sleeve 10.

Figure 3:
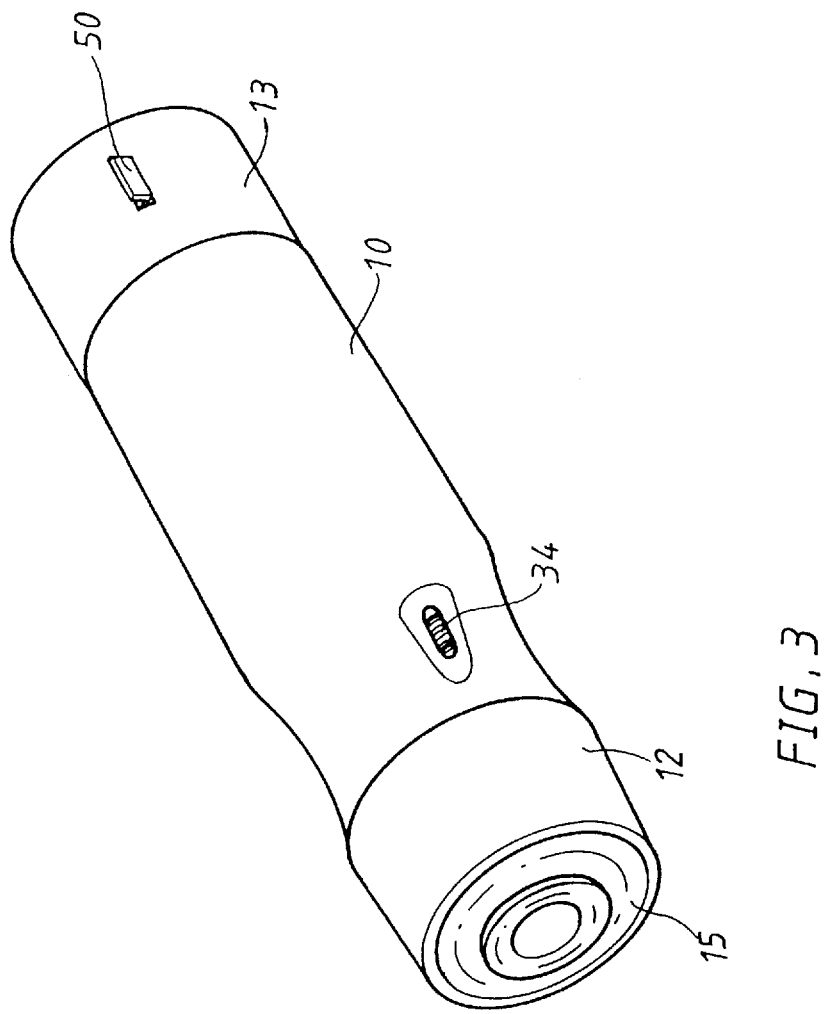
FIG. 3 is a perspective view of the multi-purpose tool in accordance with the present invention.
Figure 4:
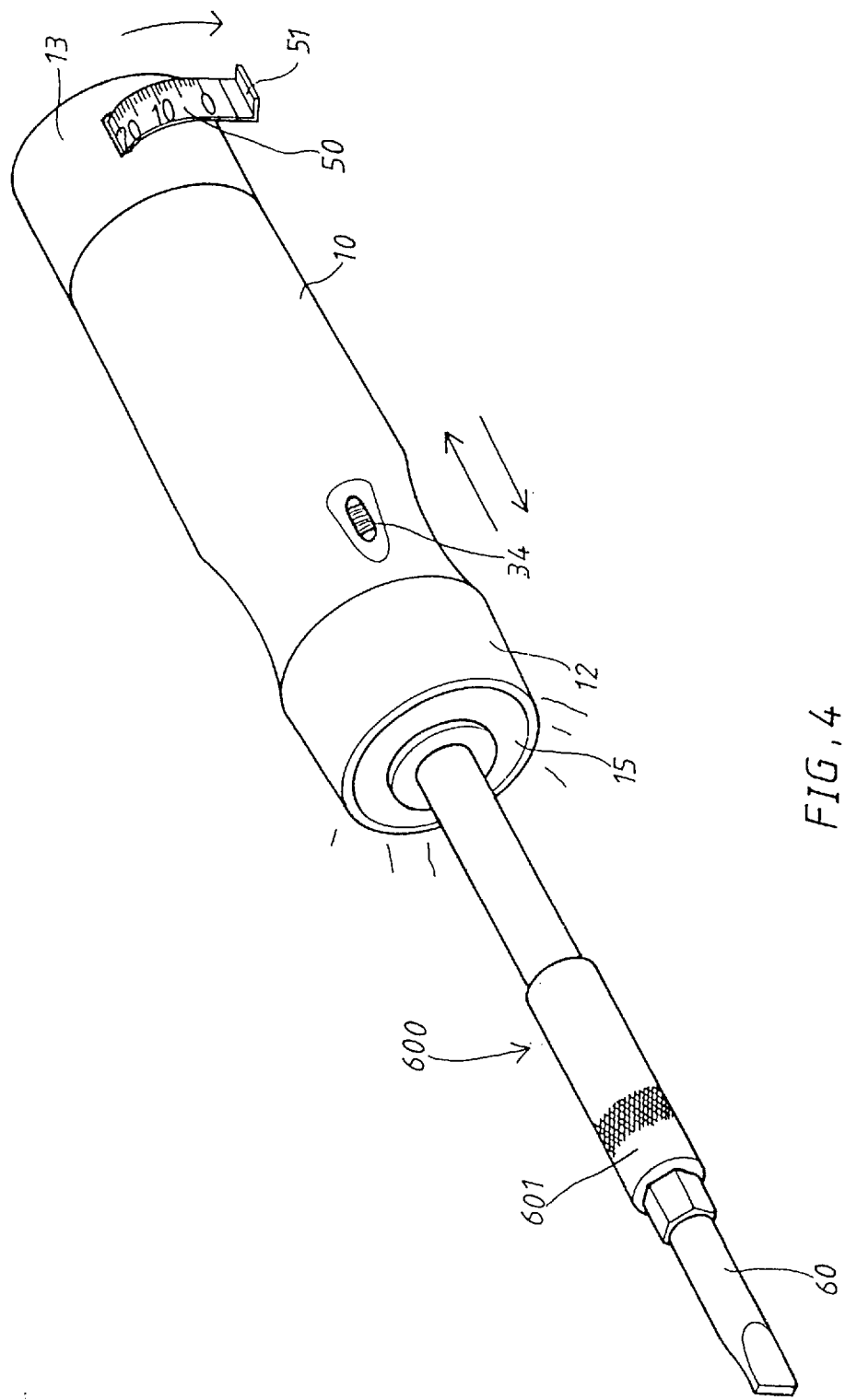
FIG. 4 is a perspective view of the multi-purpose tool when used as a screw driver in accordance with the present invention.

A base member 15 has four ridges 151 extending longitudinally from a periphery thereof so as to be received in the grooves 14 of the sleeve 10 and the base member 15 is positioned by the collar member 12. A transparent end member 152 is formed to one of two ends of the base member 15 and has a hole 153 defined therethrough so as to allow a shank 600 (FIG. 3) inserted therethrough.

Figure 8:
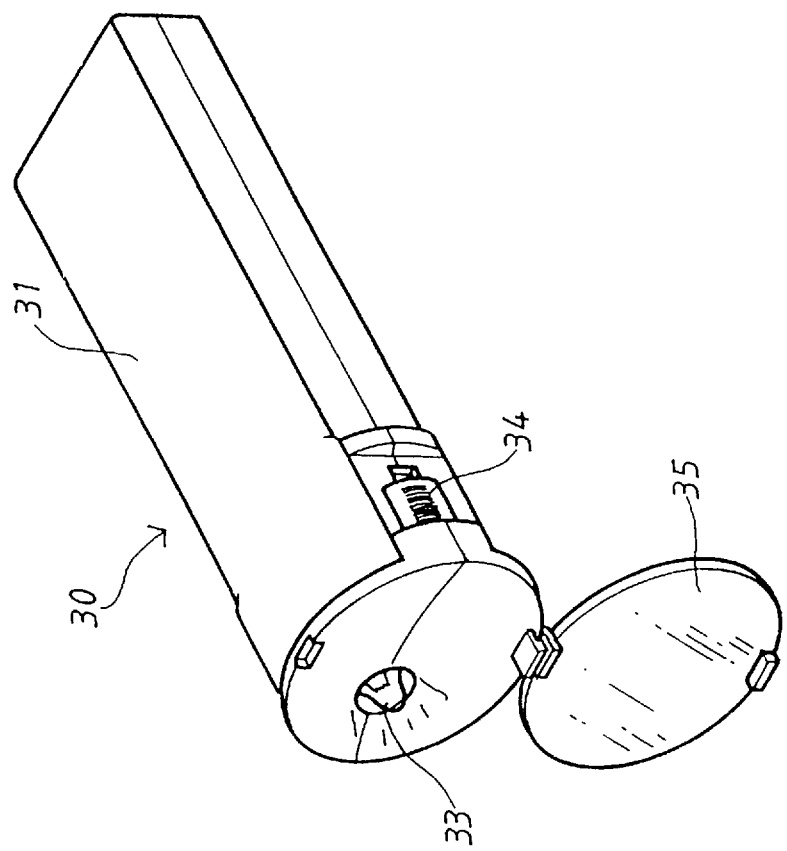
FIG. 8 is a perspective view of the flashlight of the multi-purpose tool in accordance with the present invention.

Referring to FIG. 8, a flashlight 30 has two parts 31 pivotally connected to each other so as to receive two batteries 32 between the two parts 31. A bulb 33 is disposed to one of two ends of a combination of the two parts 31 and is controlled by a switch 34 which can be accessed via the aperture 16. The flashlight 30 further has a magnifier 35 pivotally disposed to the end having the bulb 33 disposed thereto.

Figure 6:
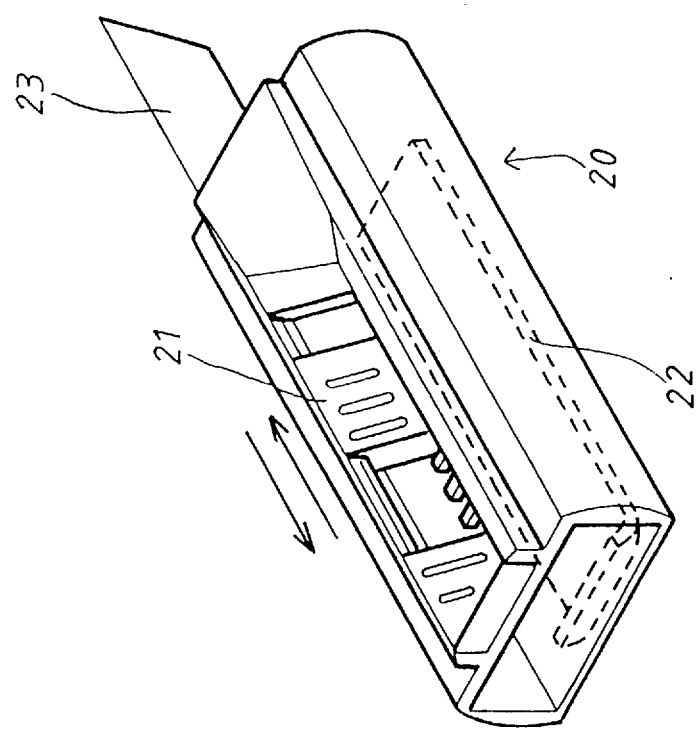
FIG. 6 is a perspective view of a knife assembly of the multi-purpose tool in accordance with the present invention.
Figure 7:
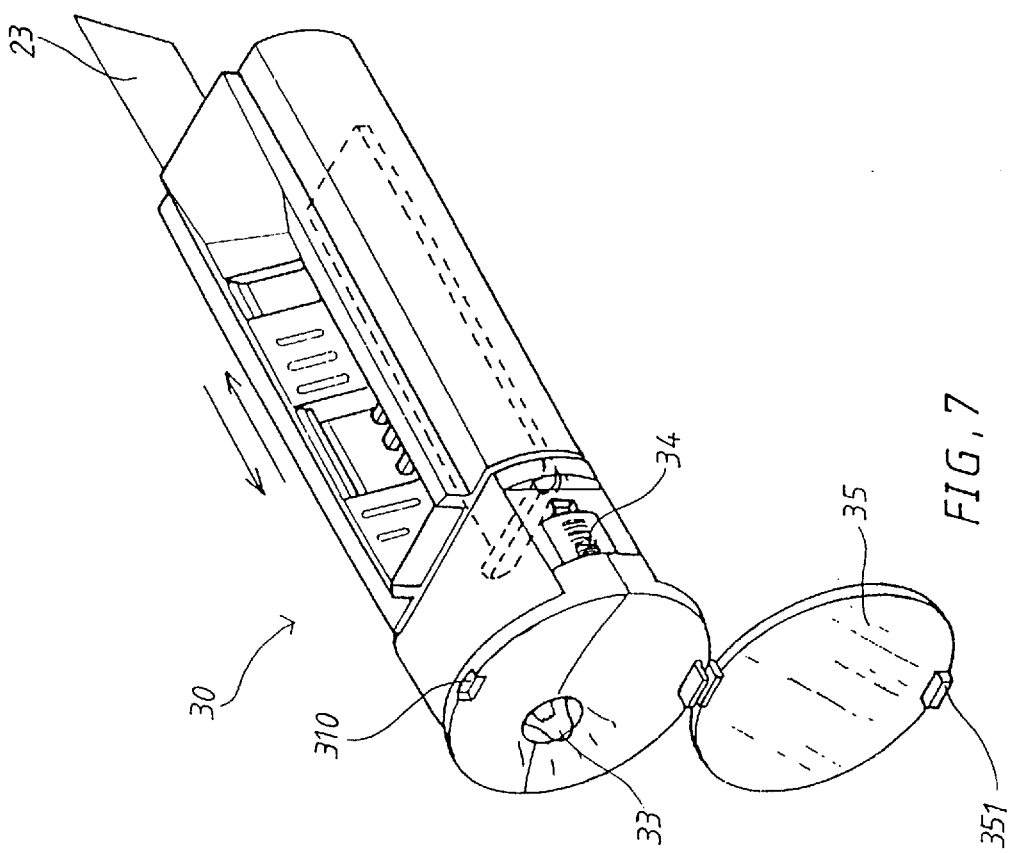
FIG. 7 is a perspective view of a combination of the knife assembly and a flashlight of the multi-purpose tool in accordance with the present invention.

Also referring to FIG. 6, a knife assembly 20 is received in the sleeve 10 and has a blade 23 retractably disposed to a first side thereof, wherein the blade 23 is controlled by a locking means 21. A receiving area 24 is defined between the first side and a second side of the knife assembly 20 so as to receive the flashlight 30 therein as shown in FIG. 7. The knife assembly 20 further has a clip member 22 disposed to an outer surface of the second side thereof.

Figure 5:
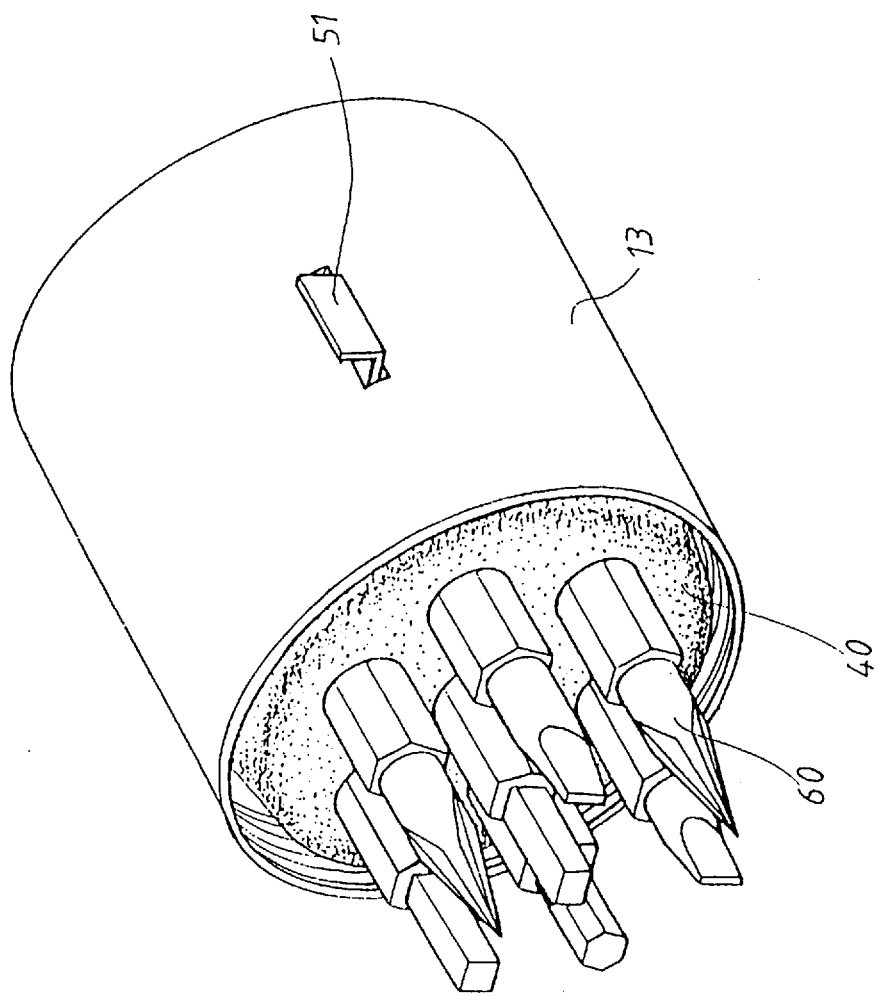
FIG. 5 is a perspective view of a receiving member received in a cap of the multi-purpose tool in accordance with the present invention.

Also referring to FIG. 5, a receiving member 40 is received in the cap 13 and has a plurality of tips 60 removably disposed thereto. A scrolled ruler 50 is received in the cap 15 with an end hook 51 of the scrolled ruler 50 extending from the slot 17.

Referring to FIG. 3 again, the shank 600 has an adaptor 601 disposed thereto so as to receive a tip 60 and the switch 34 is shift to emit light via the transparent member 152 so as to light up an object to be screwed. Referring to FIGS. 2 and 7, the magnifier 35 has a protrusion 351 extending laterally therefrom and one of the two parts 31 has a recess 310 defined therein so as to receive the protrusion 351. Of course, the magnifier 35 can be used to magnify an object if needed.

The multi-purpose tool of the present invention provides a new combination to combine the flashlight 30, the knife assembly 20, a plurality of tips 60 and a scrolled ruler 50 so as to provide users a different choice.

Although the invention has been explained in relation to its preferred embodiment, it is to be understood that many other possible modifications and variations can be made without departing from the spirit and scope of the invention as hereinafter claimed.

What is claimed is:

1. A multi-purpose tool comprising:

a sleeve having a first end with at least two grooves defined longitudinally in an inner periphery thereof, and a second end to which a cap is mounted, an aperture defined through a periphery of said sleeve;

a base member having at least two ridges extending longitudinally from a periphery thereof so as to be received in said grooves of said sleeve, a transparent end member formed to one of two ends of said base member and having a hole defined therethrough;

a flashlight having two parts pivotally connected to each other so as to receive at least one battery between said two parts, a bulb disposed to one of two ends of a combination of said two parts;

a knife assembly received in said sleeve and having a blade retractably disposed to a first side thereof and a receiving area defined between said first side and a second side of said knife assembly so as to receive said flashlight therein, and a receiving member received in said cap and having a plurality of tips removably disposed thereto.

2. The multi-purpose tool as claimed in claim 1 wherein said cap has a slot defined through a periphery thereof and a scrolled ruler is received in said cap with an end hook of said scrolled ruler extending from said slot.

3. The multi-purpose tool as claimed in claim 1 wherein said flashlight has a magnifier pivotally disposed to said end having said bulb disposed thereto.

4. The multi-purpose tool as claimed in claim 1 wherein said sleeve has a collar member securely mounted to said first end thereof so as to limit said base member from dropping.

5. The multi-purpose tool as claimed in claim 1 wherein said flashlight has a switch disposed thereto which is accessed via said aperture.

6. The multi-purpose tool as claimed in claim 1 wherein said knife assembly has a clip member disposed to an outer surface of said second side thereof.

* * * * *